T. D. SARGENT.
Oil Still.
No. 20,587.
Patented June 15, 1858.
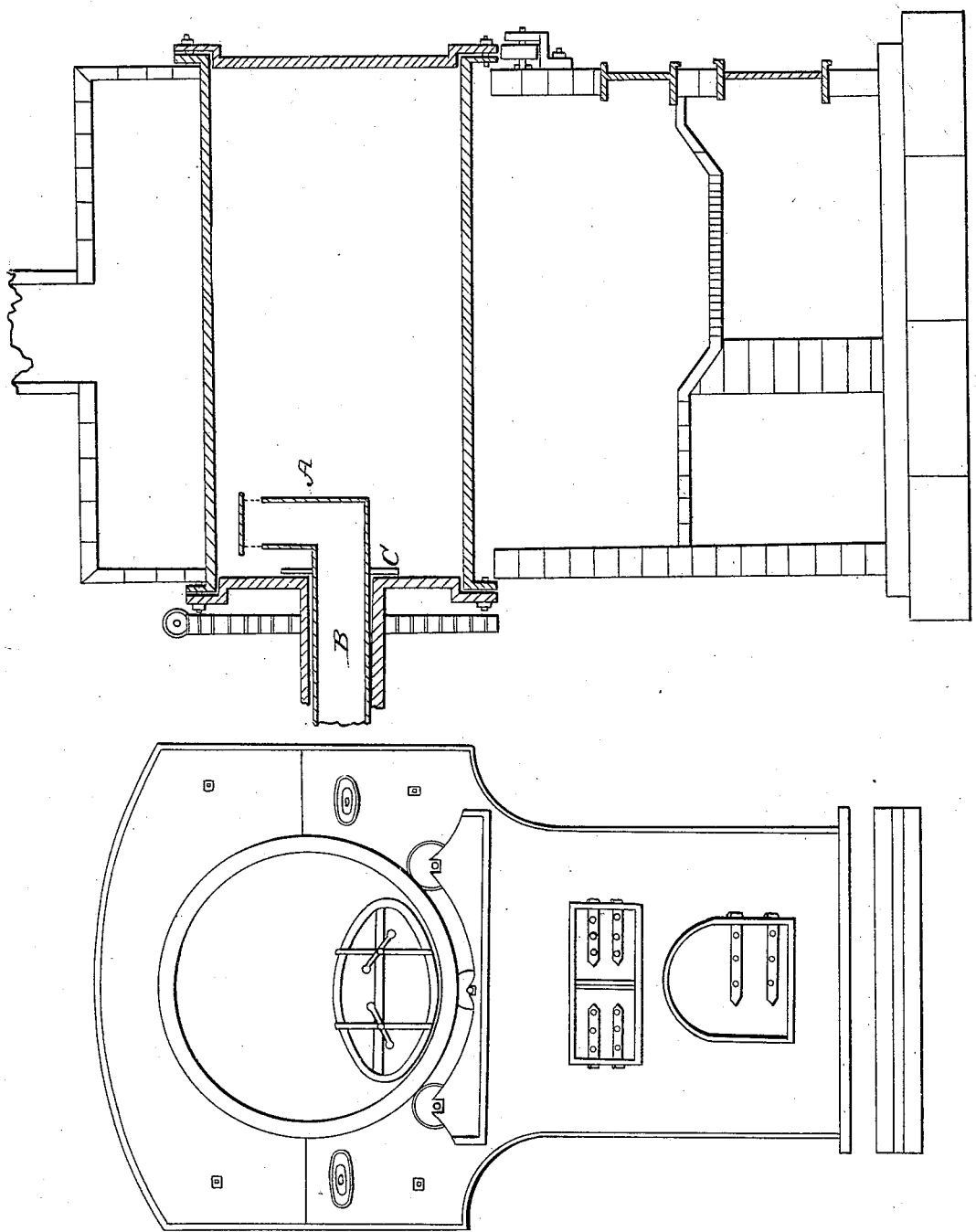
Witnesses
Inventor
Thomas D. Sargent

UNITED STATES PATENT OFFICE.

T. D. SARGENT, OF WASHINGTON, DISTRICT OF COLUMBIA.

IMPROVEMENT IN RETORTS FOR DISTILLING OIL FROM COAL.

Specification forming part of Letters Patent No. 20,587, dated June 15, 1858.

*To all whom it may concern:*

Be it known that I, THOS. D. SARGENT, of Washington city, District of Columbia, have invented a new and useful Machine for the Distillation of Coal and other Mineral Substances; and I do hereby declare that the following is a full, clear, and exact description of the construction and operation of the same, reference being had to the annexed drawing, making a part of this specification, and to the letters of reference marked thereon.

The nature of my invention consists in a revolving or oscillating retort, to be used in the obtaining of volatile liquids arising from the distillation of coal. This is accomplished by building a clay cylinder of suitable dimensions, and to both ends I attach suitable heads of iron, fill the cylinder with coals or other minerals, apply fire underneath, and cause the cylinder to revolve slowly, as may be readily understood by reference to the accompanying drawing; or the foregoing means of distillation may be varied as follows: I build a clay cylinder, as above, and proceed as before, excepting that I cause the cylinder to turn three-fourths of a revolution and then to turn back again, thus making an oscillating motion, as may be readily understood by this description and reference to the accompanying drawing. The oscillating motion of the cylinder or retort is important in distilling some descriptions of coals and other mineral substances in certain stages of the process.

By reference to the drawing my invention will be more fully understood. In it is the retort. A is a stationary pipe leading from same, to conduct vapors through B, which is a hollow journal, to the condenser. This pipe is bolted to the plumber-block or condenser-pipe, and the collar C, inside of the retort, covering the throat of the journal, is kept in position by the pressure of the vapors, so that the choking of the journal or worm by dust or small pieces of coal or other mineral substances is thereby entirely prevented.

Having thus described my invention, what I claim, and wish to secure by Letters Patent, is—

The use of a cylinder-retort made of clay, and so arranged as to revolve upon its axis during the process of distillation, or in place of a whole revolution making only three-fourths of a revolution and turning back again, thus producing an oscillating motion for a clay retort, in the manner and for the purpose set forth.

THOMAS D. SARGENT.

Attest:
P. M. PYFOR,
JOHN S. HOLLINGSHEAD.